Dec. 12, 1933.  F. LANG  1,939,453
MOTOR OPERATED AUTOMOBILE STEERING MACHINE
Filed Jan. 11, 1933   2 Sheets-Sheet 1
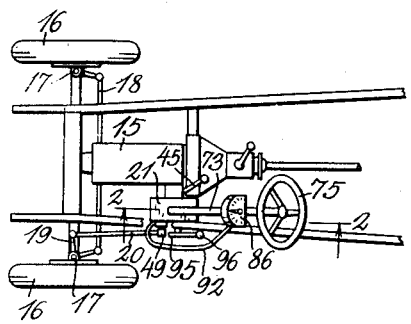
Fig.1.
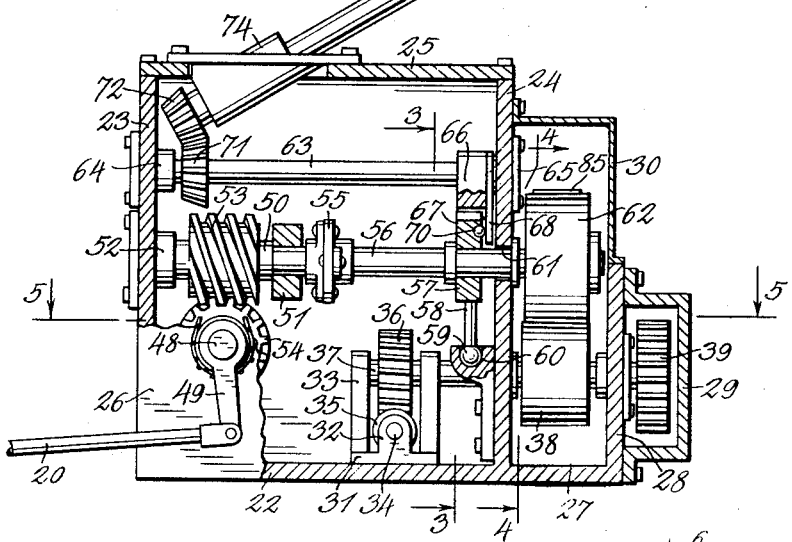
Fig.2.
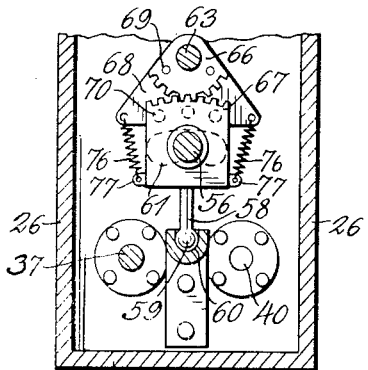
Fig.3.
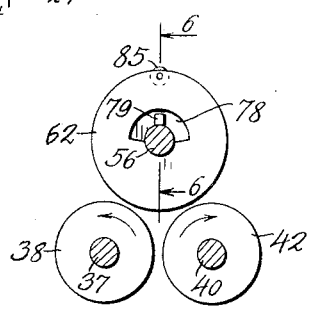
Fig.4.
Inventor
Ferdinand Lang.
By A. J. O'Brien
Attorney Dec. 12, 1933.  F. LANG  1,939,453
MOTOR OPERATED AUTOMOBILE STEERING MACHINE
Filed Jan. 11, 1933   2 Sheets-Sheet 2

Inventor
Ferdinand Lang.
By A. J. O'Brian
Attorney

Patented Dec. 12, 1933

1,939,453

UNITED STATES PATENT OFFICE 1,939,453

MOTOR OPERATED AUTOMOBILE STEERING MACHINE

Ferdinand Lang, Alcott, Denver, Colo.

Application January 11, 1933. Serial No. 651,174

6 Claims. (Cl. 180—79.3)

This invention relates to improvements in power operated steering mechanisms for automobiles and other automotive vehicles.

It is the object of this invention to produce a steering mechanism which derives its power from the engine of the vehicle and which can be employed for guiding automobiles, trucks and other motor operated devices, including boats.

This invention, briefly described, consists in a mechanism which is interposed between the propulsion motor and the steering device and by means of which the control of the wheels of the automobile or the rudder of a boat can be quickly and accurately effected by power derived from the engine.

By means of the device which forms the subject of this invention, the steering can be easily done as the operator merely controls certain shifting mechanisms after which the power required to shift the wheels or the rudder is obtained from the engine in a manner which will be hereinafter described.

It is well known to drivers of automobiles that where the parking regulations require cars to be parked parallel with the curb, a lot of maneuvering is necessary in order to get the car into a parking space and to get it out of this space. In parking a car and in getting it out from the parking space, it is necessary to turn the front wheels so as to shift the direction many times during each operation and since the shifting of the wheels must take place while the car is standing still, a large amount of strength or force is required to perform such shifting.

With the device which forms the subject of this invention, no more force is required on the part of the operator for shifting the wheels while the car is standing still than would be required when the car is in motion, as the work is all done by the engine and it is evident therefore that by means of this device a large amount of work is saved and it also becomes possible for persons of small strength to successfully park cars parallel with the curb.

In order to describe this invention so that it can be clearly understood, reference will be had to the accompanying drawings in which the preferred embodiment of the invention has been illustrated, and in which:

Fig. 1 is a top plan view of the front end of an automobile chassis showing the same equipped with the power operated steering device which forms the subject of this invention;

Fig. 2 is a section taken on line 2—2, Fig. 1, and shows the relationship of the different elements of which the device is composed;

Fig. 3 is a vertical section taken on line 3—3, Fig. 2, and shows a portion of the mechanism employed for operating the reversing gear;

Fig. 4 is a section taken on line 4—4, Fig. 2, and shows the relationship of the three gears comprising the reversing gear mechanism;

Figure 5:
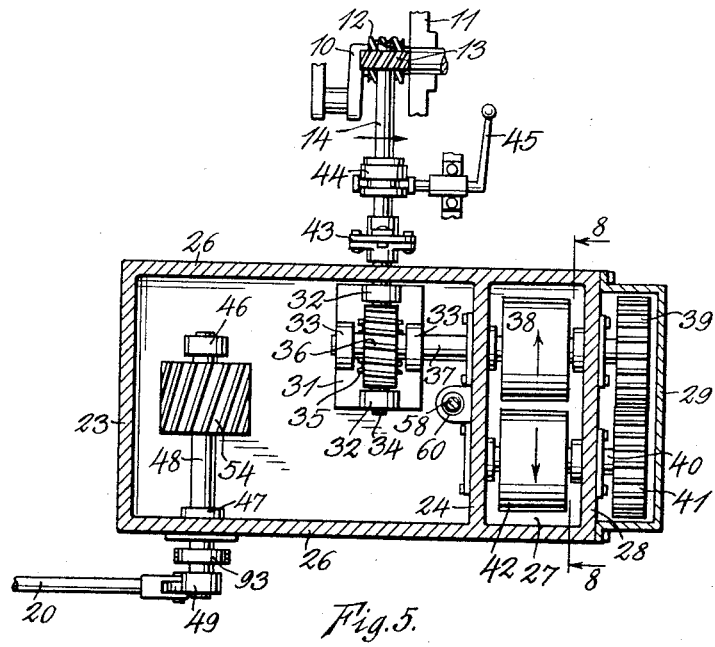
Fig. 5 is a section taken on line 5—5, Fig. 2, this view also shows the manner in which the mechanism is connected with the crank shaft of the engine.

In the drawings reference numeral 10 designates the crank shaft of an internal combustion engine which, in this case, is the engine or motor used for propelling the vehicle and numeral 11 designates the clutch. Formed on the shaft or secured to the crank shaft is a worm 12 that cooperates with a worm gear 13 on shaft 14. Although the power connection has been shown as located directly in front of the clutch, it is to be understood that it can be located any place on the crank shaft and that the position shown in the drawings is merely for the purpose of illustrating a connection. The engine has been designated by reference numeral 15 and is secured to and supported by the chassis in the ordinary manner as shown in Fig. 1. The automobile is provided with dirigible front wheels 16 that are movable about vertical pivots 17 and interconnected by rod 18, all in a manner well known. One of the wheels are provided with an axle having a lever arm or crank 19 to which the link 20 is connected. The mechanism which forms the subject of this invention is enclosed in a housing which has been designated in its entirety by reference numeral 21 in Fig. 1. The specific construction of the housing can be varied but for the purpose of illustrating and describing the invention the housing has been shown as provided with a bottom 22, a front vertical end member 23, a rear vertical end member 24, a removable cover 25 and two vertical side members 26. At the rear end of the housing a compartment has been provided which has been designated by reference numeral 27 and attached to the vertical wall 28 of the compartment 27 is a removable housing 29 whose purpose will appear as the description proceeds. A removable dust cover 30 is also provided. Secured to the base is a suitable metal casting whose base has been designated by reference numeral 31 and which is provided with two pairs of bearings 32 and 33. Journaled in the bearings 32 is a shaft 34 which is provided with a worm 35 that cooperates with a worm gear 36 secured to a shaft 37 that is journaled in the bearings 33. Shaft 37 extends through the compartment 27 and through a bearing in the wall 28 and has secured to it a friction gear 38 and an ordinary spur gear 39.

Journaled in bearings in the walls 24 and 28 is another shaft which has been designated by reference numeral 40 and secured to this shaft are a spur gear 41 and a friction gear 42. The gears 38 and 42 are preferably of the same size and are caused to rotate in opposite directions by the gears 39 and 41. The shaft 34 extends through one of the vertical sides 26 and is provided with a flexible shaft coupling 43 by means of which it is connected with the shaft 14, and therefore whenever the crank shaft is turning shafts 14 and 34 will also rotate and produce rotation of shaft 37 and friction gears 38 and 42. For convenience shaft 14 is divided into two parts which are connected by means of a suitable clutch 44. The construction of this clutch will not be described in detail because any suitable clutch mechanism can be employed and it is the intention to use for this purpose an old and well known clutch device which can be controlled by means of lever 45.

Figure 8:
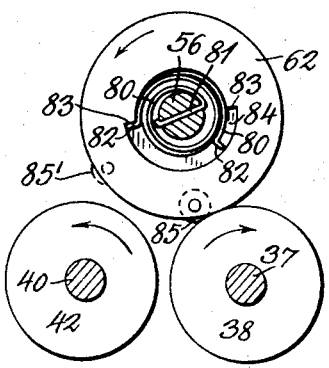
Fig. 8 is a view taken on line 8—8, Fig. 5, and shows the reversing gear in one operative position.

Journalled in suitable bearings 46 and 47 is a crank shaft 48. The outer end of this crank shaft is provided with a crank 49 to the outer end of which the link 20 is connected, as shown in Fig. 2. A drive shaft 50 is journalled in bearings 51 and 52 and is provided with a worm 53 that cooperates with the worm gear 54 carried by the shaft 48. Shaft 50 is connected by means of a flexible shaft coupling 55 with the shaft 56 which in turn is journaled in a movable bearing 57. Secured to the under side of bearing 57 is a rod 58 having a ball 59 at its lower end. The ball rests in a socket in the upper end of member 60, and supports the bearing 57. The wall 24 is provided with an arcuate slot 61 through which the shaft 56 extends in the manner shown most clearly in Fig. 3. Secured to the outer end of shaft 56 is a friction gear 62 that is located directly above the two gears 39 and 42 in the manner shown in Fig. 4. Gear 62 is normally out of contact with gears 38 and 42, but can be moved into contact with either of these gears in the manner shown in Fig. 8, by a mechanism which will now be described.

Figure 6:
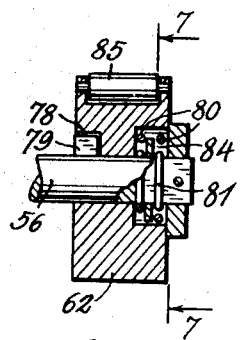
Fig. 6 is a section through one of the wheels of the reversing gear and is taken on line 6—6, Fig. 4.
Figure 7:
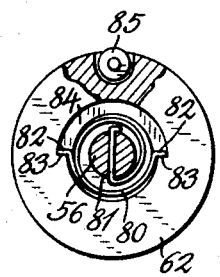
Fig. 7 is a section taken on line 7—7, Fig. 6 and shows the construction of the resilient lost motion connection and also the limit stop which will be hereinafter described.

For the purpose of shifting the friction gear 62, a shaft 63 has been provided. One end of this shaft is journaled in a bearing 64 and the other end in a bearing 65. Attached to the shaft 63 is a segmental gear 66 which meshes with another segmental gear 67 formed in the upper end of bearing 57. Whenever shaft 63 is rotated about its axis, the shaft 66 will be moved from one side to the other in the arcuate slot 61. A plate 68 is secured to the arcuate gear 66 by means of bolts or rivets 69 and extends down below the upper end of the bearing 57 and the latter is provided with a number of balls 70 that engage the surface of the plate 68 so as to form an antifriction bearing at this point. Secured to the front end of shaft 63 is a bevel pinion 71 that is engaged by another bevel pinion 72 secured to the lower end of the steering post 73. The steering post is journaled in a bearing 74 and is provided with a steering wheel 75. It is apparent that whenever the steering post 73 is turned, it will rotate the shaft 63 which in turn will transmit motion to the segmental gears 66 and 67 for the purpose of moving shaft 56 and the friction gear wheel 62 from the neutral position shown in Fig. 4 into contact with either 38 or 42 depending upon the direction in which the steering post is turned. Springs 76 are secured to the lower corners of plate 68 and to suitable lugs 77 on the bearing 57 and these springs tend to hold the friction gear 62 in the position shown in Fig. 4. The friction gear 62 is secured to shaft 56 by a lost motion connection which will now be described and reference for this purpose will be had to Figs. 4, 6, 7 and 8. From Fig. 4 it will be seen that the gear 62 has a semicircular recess 78 on its front side and that shaft 56 has a lug 79 extending into this recess. When the gear wheel is turned about the shaft, the ends of the recess 78 will come into contact with the sides of the lug 79, after which the gear 62 will rotate the shaft. For the purpose of normally holding the gear 62 in such a position relative to the shaft that the lug 79 is normally in the center of the recess, two springs have been provided. The two springs have been indicated by reference numeral 80 in Figs. 6, 7 and 8. One end of each spring is secured to the shaft as indicated by reference numeral 81 and the other ends are bent outwardly as indicated by reference numerals 82 and normally engage a shoulder 83 at the end of the arcuate recess 84. It is evident that if the gear wheel 62 is rotated in either direction from the position shown in Fig. 7, that one or the other of springs 80 will be tensioned and therefore when the rotating force is removed, the springs will return the gear wheel to normal position. The periphery of gear wheel 62 is provided with a freely rotatable roller 85 which serves as a limit stop in a manner which will be hereinafter described.

When the device constructed as above described is connected with a motor which is in operation, power will be transferred from the crank shaft 10 through the shafts 14 and 34 and through the worm gear 35 and 36 to shaft 37. When shaft 37 rotates it will produce rotation of the two friction gears 38 and 42 in the direction indicated by arrows in Figs. 4 and 8. The friction gears 38 and 42 will rotate whenever the motor operates so long as the clutch 44 is in closed position.

Let us now assume that the parts are in the position shown in Fig. 4 and that the driver rotates the steering posts 73 so as to move the friction gear 62 into contact with gear 42. As soon as these two gears come into contact, gear 62 will start turning but shaft 66 will not be rotated because there is a lost motion connection. As soon as sufficient tension has been developed in the spring 80 that is being tensioned, shaft 56 will begin to rotate and as soon as the pin 79 is engaged by the ends of the arcuate recess, a positive drive is established between the gear 62 and shaft 66 and the latter will therefore continue to rotate and by so doing will cause shaft 48 to be rotated through the one way worm gear. Whenever shaft 48 is rotated the crank arm 49 will move and impart motion to the link 20 which in turn will cause the wheels 16 to turn about their vertical pivots 17. As soon as the wheels have been turned to the extent desired, the operator releases his pressure on the steering mechanism with the result that springs 76 immediately return the gear wheel 62 to neutral position. If the operator should neglect to remove the pressure on the apparatus, wheel 62 will continue to rotate until the roller 85 comes in contact with the surface of the gear wheel 42 and further rotation of shaft 56 will then cease because the friction gear 42 instead of rotating the gear wheel 62, will turn the roller 85. When the operator now releases the pressure, the spring 80 that is under tension will return the roller 85 to the position marked 85' in Fig. 8. When the steering wheels are to be moved in the opposite directions, the operator turns the steering posts in the opposite direction from that just described with the result that gear wheel 62 will be moved into contact with gear wheel 38, Fig. 4, the operation just described will now take place for the purpose of rotating the shaft 56 and the parts controlled by it in the opposite direction and the extent of this rotation is limited by the roller 85 in the manner just described. In the drawings friction gears have been illustrated and the gears marked 38 and 42 are preferably made from some composition such as India rubber, fiber, bakelite or wood and may have their outer surfaces covered with some friction material similar to emory cloth. The gear wheel 62 may be made of a similar composition or of metal or wood. Since the gear 62 is connected with shaft 56 with the yielding lost motion connection, it is possible to substitute gear wheels having gear teeth in which case the roller 85 would be so arranged that the gear teeth would be separated at the end of the permitted motion. In the drawings the gears 38 and 42 have been shown as moving away from each other at their upper surfaces and this results in an operation in which the roller 85 will pass through the vertical plane separating the two rollers before it becomes effective and the action of the springs 85 must therefore be relied upon to move the roller back to the position indicated by 85' in Fig. 8 as soon as pressure is removed from the steering post. By reversing the rotation of the rollers 29 and 42, the need for the resilient lost motion connection will be removed, as in that case the roller 85 will never pass through the vertical plane separating the two gears 39 and 42.

Figure 9:
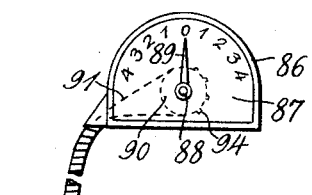
Fig. 9 is a view showing the construction of an indicator.

Since the steering wheels are nearly always hidden by means of fenders and since with this construction the steering wheel 75 is turned only through a small angle regardless of the angular motion imparted to the steering wheels, it becomes necessary to provide the device with an indicator that shall be located in such a position that it can be easily seen by the operator and which has a pointer and indicates correctly the angular position of the steering wheels. The indicator which has been combined with the mechanism described is shown in Figs. 1 and 9 and has been designated in Fig. 1 by reference numeral 86. The indicator comprises a dial 87 that has a series of numbers on its face which in the drawings has been shown as running from zero to 4. A small shaft 88 is mounted for rotation and is provided with a pointer 89. Secured to the shaft is a roller 90 about which the wire loop 91 extends. The two parallel wires of the loop pass through a tube 92 and about a roller 93 secured to shaft 48 as shown in Figs. 5 and 9. Since the roller 93 is of the same size as the roller 90, the wires will produce equal angular rotation between these rollers and the pointer 89 will therefore move at a rate corresponding to that at which the steering wheels are shifted and if zero indicates the straight ahead position and numeral 4 the maximum turning position, the other numerals will indicate intermediate positions of the wheel and the operator can therefore readily tell the position of his wheels by looking at this indicator. In order to prevent the wires 91 from slipping they are connected at their ends by links which are engaged by pins 94 so as to produce a nonslipping connection.

In case of injury to the motor to such an extent that the latter will not operate and in which case it is necessary to tow the machine, the link 20 can be disconnected from the crank 49 and connected to the lower end of a lever 95 in such a way that the operator by grasping the upper end 96 of this lever can steer the machine sufficiently to control it while being towed.

From the above description it will be apparent that the only force necessary to be exerted by the operator in shifting the wheels is that required for moving the gear wheel 62 into contact with either of the gear wheels 38 or 42 as the engine performs the work necessary for turning the wheels.

Although this invention has been designed more particularly for use with automobiles, it is evident that it can also be applied for use with boats for the purpose of controlling the rudder which in that case corresponds to the wheels 16.

I am aware that various changes can be made in the construction from that illustrated in the drawings, and therefore the drawings and the description should be considered merely as illustrative of means for the purpose and not as a limitation.

Having described the invention what I claim as new is:

1. In an automotive vehicle having a motor and steering wheels for determining the direction of travel, means for controlling the position of the steering wheels from power derived from the motor, comprising, in combination, a shaft mounted for rotation in two directions, means for transmitting motion from the shaft to the steering wheels whereby the direction of movement will be determined by the direction and the extent of rotation of the shaft, a drive shaft mounted for rotation about an axis angularly related to the axis of the first shaft, a worm gear drive between the two shafts, one end of the drive shaft having a gear wheel secured thereto, two other gear wheels mounted for rotation about parallel axes that are also substantially parallel with the axis of the drive shaft, means for interconnecting the two gears so that they will be constrained to rotate in opposite directions, means for driving the two gear wheels from the motor, and means for moving the first mentioned gear into and out of contact with either of the other two gears whereby the direction and extent of movement of the drive shaft and the steering wheels can be controlled.

2. In an automotive vehicle having a propulsion motor and dirigible front wheels for controlling the direction of travel, means for adjusting the position of the front wheels by power derived from the motor comprising a shaft having a crank arm, a link having one end connected with the crank and the other end connected with the front wheels, a drive shaft angularly related to the first shaft, a worm gear for transmitting motion from the drive shaft to the crank shaft, two gear wheels mounted for rotation about spaced parallel axes that are substantially parallel with the drive shaft, the two gears being interconnected to rotate in opposite directions, means for rotating the two gears from power derived from the motor, a gear secured to the drive shaft, and means for moving the last mentioned gear into engagement with either of the other gears whereby the link will be moved in either direction by power derived from the motor.

3. In an automotive vehicle having a propulsion motor and dirigible front wheels for controlling the direction of travel, means for adjusting the position of the front wheels by power derived from the motor comprising a shaft having a crank arm, a link having one end connected with the crank and the other end connected with the front wheels, a drive shaft angularly related to the first shaft, a worm gear for transmitting motion from the drive shaft to the crank shaft, two gear wheels mounted for rotation about spaced parallel axes that are substantially parallel with the drive shaft, the two gears being interconnected to rotate in opposite directions, means for rotating the two gears from power derived from the motor, a gear secured to the drive shaft, and means for moving the last mentioned gear into engagement with either of the other gears whereby the link will be moved in either direction by power derived from the motor.

4. In an automotive vehicle having a propulsion motor and dirigible front wheels for controlling the direction of travel, means for adjusting the position of the front wheels by power derived from the motor comprising a shaft having a crank arm, a link having one end connected with the crank and the other end connected with the front wheels, a drive shaft angularly related to the first shaft, a worm gear for transmitting motion from the drive shaft to the crank shaft, two gear wheels mounted for rotation about spaced parallel axes that are substantially parallel with the drive shaft, the two gears being interconnected to rotate in opposite directions, means for rotating the two gears from power derived from the motor, a gear secured to the drive shaft with a lost motion connection, and means for moving the last mentioned gear into engagement with either of the other gears whereby the link can be moved in either direction by power derived from the motor.

5. In an automotive vehicle having a propulsion motor and dirigible front wheels for controlling the direction of travel, means for adjusting the position of the front wheels by power derived from the motor comprising a shaft having a crank arm, a link having one end connected with the crank and the other end connected with the front wheels, a drive shaft angularly related to the first shaft, a worm gear for transmitting motion from the drive shaft to the crank shaft, two gear wheels mounted for rotation about spaced parallel axes that are substantially parallel with the drive shaft, the two gears being interconnected to rotate in opposite directions, means for rotating the two gears from power derived from the motor, a gear secured to the drive shaft, means for moving the last mentioned gear into engagement with either of the other gears whereby the link will be moved in either direction by power derived from the motor, and a limit stop for determining the extent of movement of the wheels.

6. In an automotive vehicle having a propulsion motor and dirigible front wheels for controlling the direction of travel, means for adjusting the position of the front wheels by power derived from the motor comprising a shaft having a crank arm, a link having one end connected with the link and the other end connected with the front wheels, a drive shaft angularly related to the first shaft, a worm gear for transmitting motion from the drive shaft to the crank shaft, two gear wheels mounted for rotation about spaced parallel axes that are substantially parallel with the drive shaft, the two gears being interconnected to rotate in opposite directions, means for rotating the two gears from power derived from the motor, a gear secured to the drive shaft with a resilient lost motion connection, and means for moving the last mentioned gear into engagement with either of the other gears whereby the link can be moved in either direction by power derived from the motor.

FERDINAND LANG.